United States Patent [19]
Barnum et al.

[11] Patent Number: 5,235,802
[45] Date of Patent: Aug. 17, 1993

[54] FLAME FAILURE DETECTION METHOD

[75] Inventors: B. Melvin Barnum, Avon; Russell C. Bell, Coventry, both of Conn.

[73] Assignee: United Technologies Corporation, Hartford, Conn.

[21] Appl. No.: 894,871

[22] Filed: Jun. 8, 1992

Related U.S. Application Data

[62] Division of Ser. No. 687,145, Apr. 18, 1991, Pat. No. 5,170,621.

[51] Int. Cl.$^5$ ............................................... F02C 9/00
[52] U.S. Cl. .................................................. 60/39.02
[58] Field of Search ............ 60/39.02, 39.091, 39.141, 60/39.161, 39.281, 39.821, 223

[56] References Cited

U.S. PATENT DOCUMENTS

| | | | |
|---|---|---|---|
| 2,589,971 | 3/1952 | Skarstrom | 60/39.091 |
| 3,447,340 | 7/1973 | Fenton et al. | 60/39.281 |
| 3,765,176 | 10/1973 | Nelson et al. | 60/223 |
| 3,805,517 | 4/1974 | Sewell et al. | 60/39.091 |
| 3,830,055 | 8/1974 | Erlund | 60/39.091 |
| 4,597,259 | 7/1986 | Moore et al. | 60/39.091 |

Primary Examiner—Louis J. Casaregola
Attorney, Agent, or Firm—Edward L. Kochey, Jr.

[57] ABSTRACT

A dual rotor gas generator of a gas turbine generator is fired with fuel delivery based on a fuel demand signal. Actual air flow is determined by sensing the low pressure rotor speed. A ratio of the fuel demand and actual air flow is calculated. Actual fuel flow is not used. Loss of flame is detected based on a fuel/air ratio as compared to a preselected value.

2 Claims, 2 Drawing Sheets

FLAME FAILURE DETECTION METHOD

This is a division of copending application Ser. No. 687,145 filed on Apr. 18, 1991, U.S. Pat. No. 5,170,621.

DESCRIPTION

1. Technical Field

The invention relates to gas turbine power generators and in particular to land based turbines.

2. Background of the Invention

In gas turbine engines there is no independent supply or control of airflow to the combustor. Firing the combustor drives the turbine which is direct connected to the compressor, thereby supplying the airflow.

During load operation fuel is input to maintain a controlled power output, speed and/or temperature. The fuel air ratio is dictated by the gas turbine design, varying somewhat through the load range and during transients. An increase in fuel flow increases gas temperature, initiating a turbine speed increase. This increases the compressor speed providing an increased airflow. The rate of change of fuel flow is limited to, among other things, avoid excessive swings in fuel air ratio.

In the event of a flameout in a combustor, fuel continues to be introduced by the control system in an attempt to meet demand. Airflow continues as the unit coasts down. This introduction of unburnt fuel into the air produces an explosive mixture which could be set off by any hot spot or spark. The potential magnitude of any explosion is a function of the amount of fuel present and the stoichiometry of the mixture.

Flame scanners in gas turbine engine combustors are not desirable because of sooting problems and background incandescence of materials inside the combustor and turbine area. A simple reliable means for detecting a flameout and effecting a timely trip of the fuel is desired.

SUMMARY OF THE INVENTION

The conventional land based gas generator has a high and low compressor connected to a high and low turbine, respectively. Fuel is fired into the combustor between the compressors and turbines and a free power turbine is located downstream of the low pressure turbine.

Airflow sensing means sense a measure of the actual airflow, this airflow sensing means preferably being a sensing of the speed of the low pressure compressor. Conventional control means exist for establishing a fuel demand signal in response to the various factors to be controlled. A valve responds to this fuel demand signal to supply fuel to the combustor.

A calculating means calculates the ratio of fuel demand to actual airflow. In response to this ratio reaching a preselected value, it is assumed that a flame failure has occurred and accordingly the fuel shut off valve is tripped. This trigger ratio may vary in the load range and in particular may be different between below idle and above idle speeds.

DESCRIPTION OF THE PREFERRED EMBODIMENT

Figure 1:
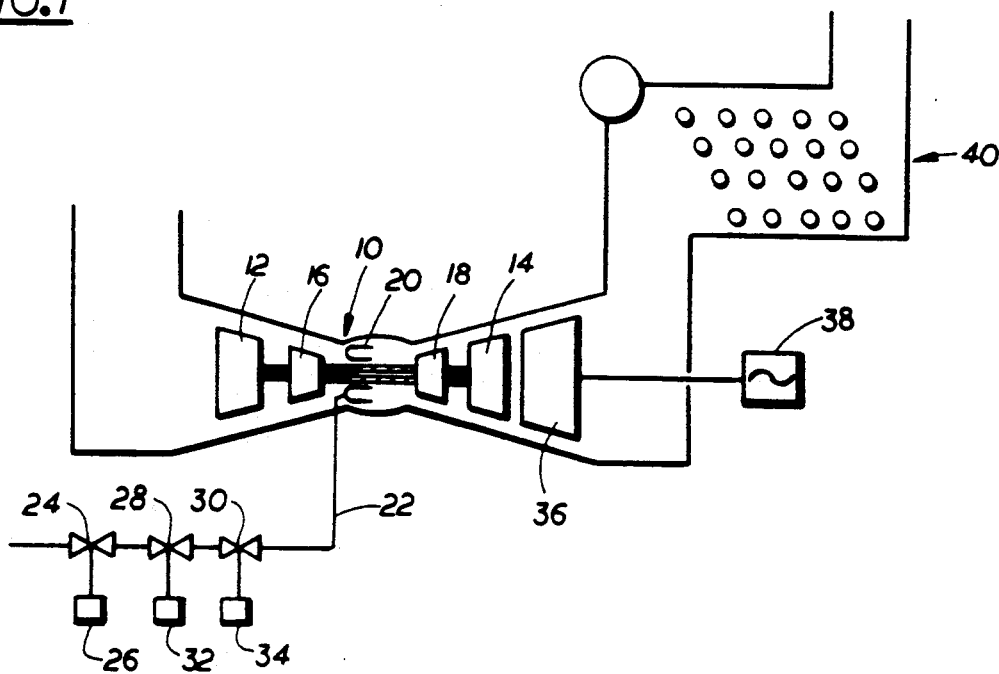
FIG. 1 is a schematic of a gas turbine engine system.

Referring to FIG. 1, the gas generator 10 includes a low pressure rotor comprised of a low pressure compressor 12 direct connected to low pressure turbine 14. Also, a high rotor with a high pressure compressor 16 is directly connected to high pressure turbine 18. A plurality of combustors 20 receive fuel from fuel supply line 22 with the flow being modulated by control valve 24 driven by actuator 26. Fast operating valves 28 and 30 may be closed for the purpose of tripping fuel by actuators 32 and 34. A power turbine 36 is located downstream of the low pressure turbine 14 and is direct connected to a power generator 38. Waste heat steam generator 40 receives the exit gas flow from the gas turbine for the generation of additional power.

Figure 2:
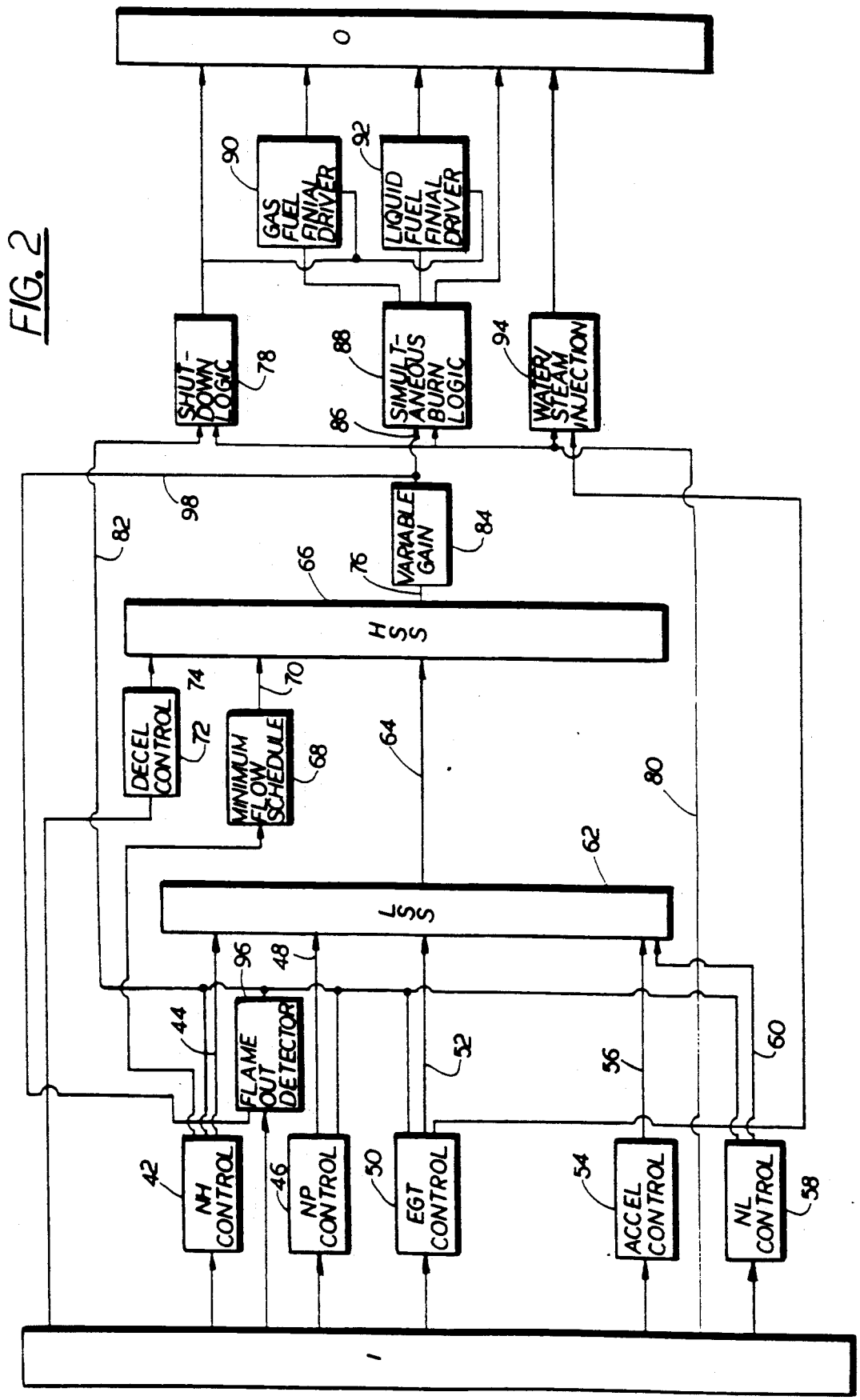
FIG. 2 is a control schematic of the fuel control.

Referring to FIG. 2, high pressure rotor speed control 42 sends a signal through line 44 indicative of fuel demand. Power turbine control 46 sends a signal also indicative of fuel demand through control line 48. Exit gas temperature control 50 sends a similar signal through line 52. The acceleration limit control 54 sends a fuel demand signal through line 56 while low pressure rotor speed control 58 sends such a signal through control line 60.

These signals are all sent to low signal select 62 where the low signal is selected and sent through control line 64 to high signal select 66.

Also entering high signal select 66 is a signal from minimum flow schedule 68 through line 70 and a signal from deceleration control 72 through line 74. The selected high signal indicative of fuel demand is sent through control line 76. Emergency shutdown indicated by logic box 78 may be initiated by manual trip line 80 or control trip line 82 which receives signals from the various control loops indicated to an extreme condition dictating a trip.

Since the gas turbine is more responsive to fuel increases at high loads than at low loads, a variable gain 84 is applied to the fuel demand signal through line 76 producing a modified fuel demand signal in line 86. This signal is substantially the square of the unmodified signal in line 76.

This gas turbine is arranged to burn either liquid fuel, gaseous fuel, or a combination of the two. It has been found effective to set the fuel demand signal in lines 76 and 86 as based on a weight flow of liquid fuel. Appropriate modifications of this signal are made in simultaneous burn logic 88 which send appropriate signals to gas fuel final driver 90 and liquid fuel final driver 92.

Water steam injection logic 94 introduces water or steam along with the fuel in response to the exit gas temperature to achieve increased power in accordance with well known gas turbine principles. While this increases the power output it does also increase the probability of flameout. Flameouts, of course, may also occur from other triggering situations.

In the event of a flameout, regardless of which of the control loops is dictating operation at the time, there will be an instantaneous demand for an increased fuel flow. It is this demand signal rather than any actual fuel flow, or response of a fuel flow valve, which is used as a basis for triggering the flame failure detection. The signal obviously leads any response to the signal by the fuel valves, and functions regardless of any possible jamming of the valve or blockage of the fuel flow path. For the purpose of the logic of flameout detector 96, a signal indicative of the fuel demand is sent through control line 98.

Figure 3:
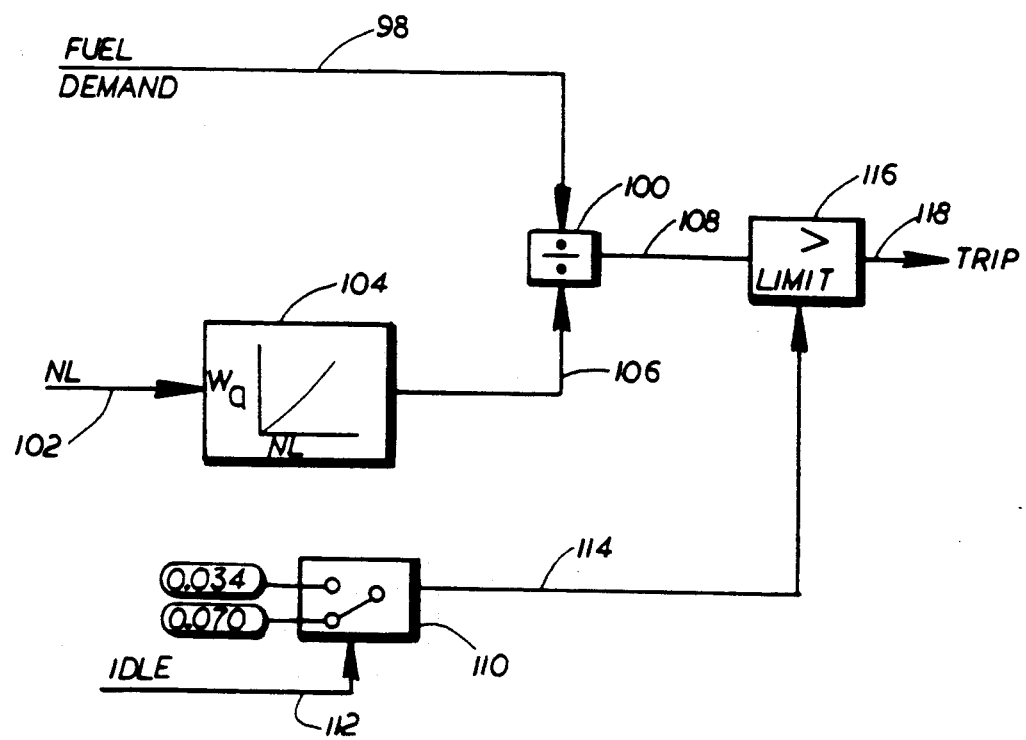
FIG. 3 is a schematic of the flameout detection logic.

As shown in FIG. 3, this fuel demand signal passes to division function 100. A measure of airflow also passes to this division signal. Preferably a signal 102 indicative of the low pressure rotor speed is used which in accordance with logic box 104 establishes an actual airflow as a function of the rotor speed. This actual airflow signal passes through control line 106 where the fuel/air ratio is calculated in box 100 resulting in a fuel/air ratio signal in line 108.

Using a heating value of the fuel of 18,500 BTU's per pound and a required air for combustion of 755 pounds per million BTU, the stoichiometric fuel/air ratio in weight units is 0.072. During start the gas turbine overall fuel/air ratio is set to operate at 0.028 fuel/air ratio while at idle this ratio decreases to 0.008. At full power the unit operates at a fuel air ratio of 0.024. Considering ordinary deviations in the operation and transient conditions, the fuel/air ratio should never exceed 0.034 in normal operation nor 0.070 below idle.

Therefor, while monitoring the fuel demand signal and a measure of the actual airflow, the ratio is continuously watched. Below idle, if this ratio exceeds 0.070, or if above idle the ratio exceeds 0.034, a flame failure exists and the quick closing fuel valves are tripped.

Response time for such operation has found to be on the order of 0.6 seconds. The use of the demand signal leads the actual fuel flow, and the amount of fuel injected into the injector during a short period will not lead to a significant explosive mixture.

Referring again to FIG. 3, the limit selector 110 receives a signal through line 112 indicating whether operation is above or below idle. The appropriate limit, either 0.034 or 0.070 is sent through line 114 to comparison logic 116. Should the fuel/air ratio signal in line 108 exceed the limit set in line 114, a trip signal 118 is sent to trip the fast operating trip fuel valves.

We claim:

1. A method of operating a gas turbine engine having a combustor, comprising:
   establishing a fuel demand signal;
   sending a fuel quantity to said combustor in response to said fuel demand signal;
   burning said fuel in said combustor;
   generating an air flow as a function of the fuel being burnt;
   sensing a measure of said airflow;
   producing a fuel demand / air flow ratio;
   comparing said ratio to a preselected value; and
   declaring a flameout when said ratio exceeds said preselected value.

2. A method of operating a gas turbine engine having a combustor, comprising:
   establishing a fuel demand signal;
   sending a fuel quantity to said combustor in response to said fuel demand signal;
   burning said fuel in said combustor;
   generating an air flow as a function of the fuel being burnt;
   sensing a measure of said airflow;
   producing a fuel demand / air flow ratio;
   comparing said ratio to a preselected value; and
   declaring a flameout when said ratio exceeds said preselected value;
   said preselected value representing a fuel/air ratio of substantially 50% of the stoichiometric ratio.

* * * * *